No. 799,919. PATENTED SEPT. 19, 1905.
W. MONROE.
WHEEL TIRE.
APPLICATION FILED MAR. 24, 1905.
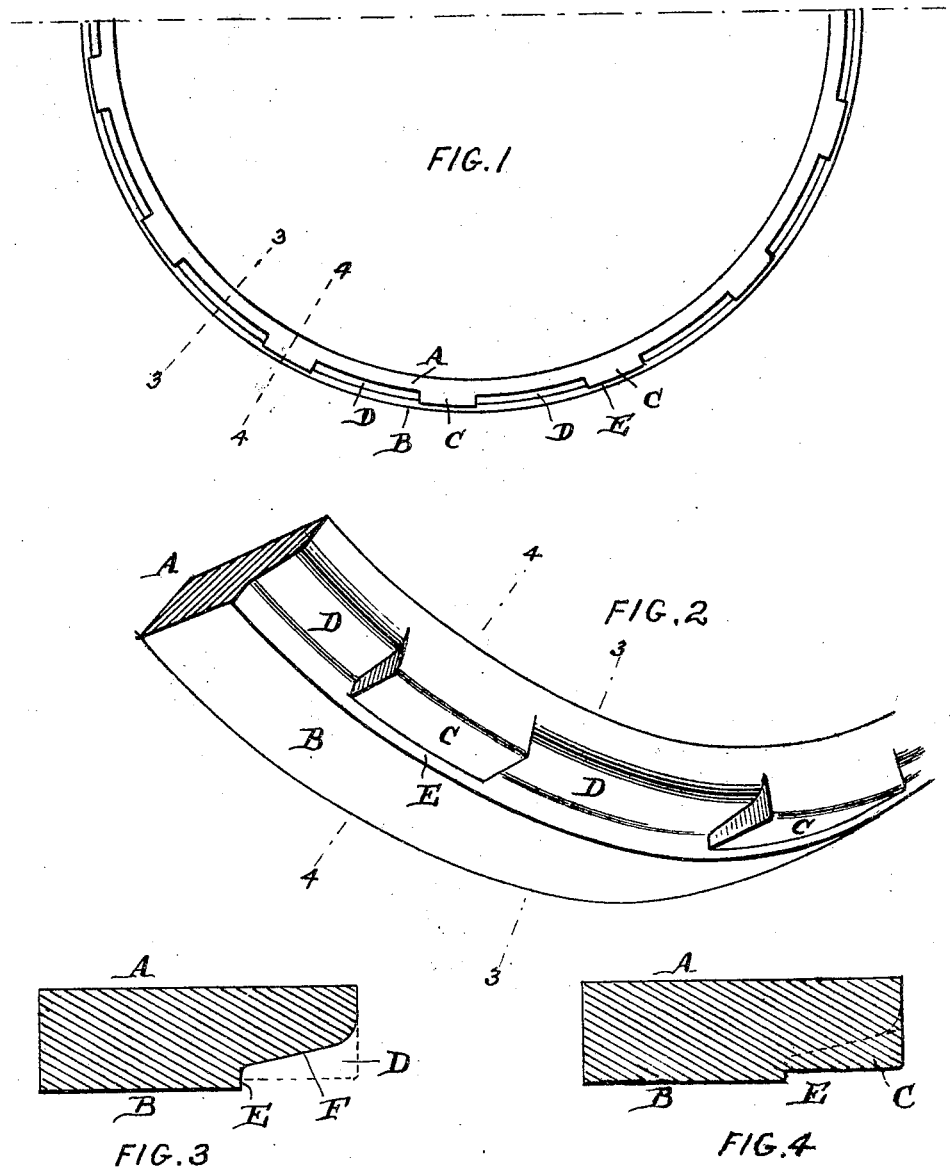
Attest
A. M. Kelly.
M. J. Egan.
Inventor
Whitall Monroe
By his Atty

UNITED STATES PATENT OFFICE.

WHITALL MONROE, OF MOUNT HOLLY, NEW JERSEY, ASSIGNOR OF ONE-HALF TO EDWARD NIPPINS, OF MOUNT HOLLY, NEW JERSEY.

WHEEL-TIRE.

No. 799,919.     Specification of Letters Patent.     Patented Sept. 19, 1905.

Application filed March 24, 1905. Serial No. 251,777.

*To all whom it may concern:*

Be it known that I, WHITALL MONROE, of Mount Holly, county of Burlington, and State of New Jersey, have invented an Improvement in Wheel-Tires, of which the following is a specification.

My invention has reference to wheel-tires; and it consists of certain improvements which are fully set forth in the following specification and shown in the accompanying drawings, which form a part thereof.

The object of my invention is to provide a construction of wagon-wheel tire which shall have capacity for elevating itself out of a car-track when pulled at an angle slightly oblique to the track.

My improved wheel-tire consists of a circular band having a cylindrical body provided with lateral recesses and lugs arranged alternately and at the outer edge of the wheel, whereby normally the lugs will not run upon the track, but will form steps adapted to ride upon the head of the rail and lift the wheel when pulled obliquely across it.

My invention will be better understood by reference to the drawings, in which—

Figure 1 is a side elevation of a portion of a wheel-tire embodying my invention. Fig. 2 is a perspective view of a portion of same. Fig. 3 is a cross-section on line 3 3 of Fig. 1, and Fig. 4 is a cross-section on line 4 4 of Fig. 1.

A is the circular body of the tire and is made of the cross-section shown in Figs. 3 and 4. It is provided with the cylindrical part B, adapted to take the wear when running upon a hard road or upon the track, and also has the lateral lugs C and recessed portions D arranged alternately. The recesses D are preferably considerably longer than the lugs C. The circumferential surfaces of the lugs C have a diameter slightly less than the part B, so as to form the offset or shoulder E. The recesses D are preferably formed with oblique curved surfaces F between the lugs, so as to constitute a tapered cross-section to one side of the tire and enable it to readily pass over the head of the rail when the wheel is turned at an angle to the rail.

It will be seen that the ordinary wear will fall upon the part B, and hence the lugs C will be preserved for a time commensurate with the life of the said part B. It is preferable that the width of the lugs C shall approximate one-third the total width of the tire; but I do not restrict myself to this proportion.

Having now described my invention, what I claim as new, and desire to secure by Letters Patent, is—

1. A wheel-tire consisting of a circular band of metal having the greater portion of the width of its circumferential surface cylindrical of uniform diameter and smooth and provided with lateral projections of uniform diameter transversely considered and recesses of a circumferential length approximately equal to or greater than the corresponding length of the projections said parts being adjacent to the outer edge of the cylindrical portion and arranged alternately, and in which the circumferential diameter of the projections is less than the diameter of the cylindrical portion and the length of the recess is greater than the transverse width of the projections.

2. A wheel-tire consisting of a circular band of metal having the greater portion of the width of its circumferential surface cylindrical of uniform diameter and smooth and provided with lateral projections and recesses adjacent to the outer edge of the cylindrical portion and arranged alternately, and in which the circumferential diameter of the projections is less than the diameter of the cylindrical portion of the tire and in which the recesses have oblique surfaces F curved circumferentially between the projections and impart to the tire a tapered cross-section adjacent to one side.

In testimony of which invention I hereunto set my hand.

WHITALL MONROE.

Witnesses:
    R. M. HUNTER,
    R. M. KELLY.